(12) United States Patent
Khlat

(10) Patent No.: US 10,374,652 B2
(45) Date of Patent: Aug. 6, 2019

(54) ANTENNA SWITCHING IN A COMMUNICATION CIRCUIT

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 248 days.

(21) Appl. No.: 14/872,800

(22) Filed: Oct. 1, 2015

(65) Prior Publication Data

US 2016/0119016 A1 Apr. 28, 2016

Related U.S. Application Data

(60) Provisional application No. 62/069,575, filed on Oct. 28, 2014.

(51) Int. Cl.
*H01Q 21/28* (2006.01)
*H04B 1/44* (2006.01)
*H04B 7/06* (2006.01)
*H04B 7/08* (2006.01)
*H04L 5/14* (2006.01)

(52) U.S. Cl.
CPC .............. *H04B 1/44* (2013.01); *H01Q 21/28* (2013.01); *H04B 7/0602* (2013.01); *H04B 7/0686* (2013.01); *H04B 7/0871* (2013.01); *H04L 5/14* (2013.01)

(58) Field of Classification Search
CPC ........ H04B 7/04; H04B 7/061; H04B 7/0602; H04B 7/0697; H04B 7/0842; H04B 7/0868; H04B 7/0871; H04B 1/44; H04B 7/0686; H01Q 21/28
USPC .......... 370/252, 280, 329, 278, 282; 455/78, 455/114.2, 101; 375/299
See application file for complete search history.

(56) References Cited

U.S. PATENT DOCUMENTS

| 7,088,965 B1* | 8/2006 | Ngan | H04B 7/0871 455/114.2 |
| 2011/0200143 A1* | 8/2011 | Koo | H04B 7/0697 375/299 |
| 2013/0149975 A1* | 6/2013 | Yu | H04B 7/0868 455/78 |

* cited by examiner

*Primary Examiner* — Harun Chowdhury
(74) *Attorney, Agent, or Firm* — Withrow & Terranova, P.L.L.C.

(57) ABSTRACT

Aspects disclosed in the detailed description include antenna switching for a communication circuit. A communication circuit includes an antenna switching circuit that couples the communication circuit to a first antenna and/or a second antenna for radio frequency (RF) signal transmission and reception. The antenna switching circuit is configured to include fewer antenna switches compared to a conventional antenna switching circuit to reduce the cost and footprint of the communication circuit. Furthermore, by reducing the number of antenna switches in the antenna switching circuit, it is possible to improve RF isolation between the first antenna and the second antenna, thus leading to improved RF performance of the communication circuit.

12 Claims, 6 Drawing Sheets

ANTENNA SWITCHING IN A COMMUNICATION CIRCUIT

PRIORITY APPLICATIONS

This application claims the benefit of U.S. Provisional Patent Application Ser. No. 62/069,575, filed Oct. 28, 2014, which is incorporated herein by reference in its entirety.

FIELD OF THE DISCLOSURE

The technology of the disclosure relates generally to antenna switching in a wireless communication device.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being purely communication tools into sophisticated mobile entertainment centers, thus enabling enhanced user experiences.

Mobile communication devices such as smartphones typically include more than one antenna. These antennas may be flexibly configured and opportunistically reconfigured to support various usage scenarios. For example, when a mobile communication device needs to increase data throughput, multiple antennas may be configured to support multiple-input multiple output (MIMO) communications. When the mobile communication device experiences strong external radio frequency (RF) interference, multiple antennas may be configured to enable diversity combining. When a primary antenna is physically blocked (e.g., by a user's hand), an auxiliary antenna may be configured to serve as the primary antenna. As such, it may be desirable to configure and utilize antennas effectively in the mobile communication devices.

SUMMARY

Aspects disclosed in the detailed description include antenna switching for a communication circuit. A communication circuit includes an antenna switching circuit that couples the communication circuit to a first antenna and/or a second antenna for radio frequency (RF) signal transmission and reception. The antenna switching circuit is configured to include fewer antenna switches compared to a conventional antenna switching circuit to reduce the cost and footprint of the communication circuit. Furthermore, by reducing the number of antenna switches in the antenna switching circuit, it is possible to improve RF isolation between the first antenna and the second antenna, thus leading to improved RF performance of the communication circuit.

In this regard, in one aspect, a communication circuit is provided. The communication circuit comprises a first RF signal path configured to transmit a first RF signal during an assigned transmit (TX) period and receive a second RF signal during an assigned receive (RX) period temporally distinct from the assigned TX period. The communication circuit also comprises a second RF signal path configured to receive the second RF signal during the assigned RX period. The communication circuit also comprises an antenna switching circuit. The antenna switching circuit is configured to couple the first RF signal path to one of a first antenna and a second antenna to transmit the first RF signal during the assigned TX period. The antenna switching circuit is also configured to couple the first RF signal path to the first antenna to receive the second RF signal during the assigned RX period. The antenna switching circuit is also configured to couple the second RF signal path to the second antenna to receive the second RF signal during the assigned RX period.

In another aspect, a method for antenna switching is provided. The method comprises transmitting a first RF signal via one of a first antenna and a second antenna during an assigned TX period. The method also comprises receiving a second RF signal concurrently from the first antenna and the second antenna during an assigned RX period temporally distinct from the assigned TX period.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include antenna switching for a communication circuit. A communication circuit includes an antenna switching circuit that couples the communication circuit to a first antenna and/or a second antenna for radio frequency (RF) signal transmission and reception. The antenna switching circuit is configured to include fewer antenna switches compared to a conventional antenna switching circuit to reduce the cost and footprint of the communication circuit. Furthermore, by reducing the number of antenna switches in the antenna switching circuit, it is possible to improve RF isolation between the first antenna and the second antenna, thus leading to improved RF performance of the communication circuit.

Figure 1:
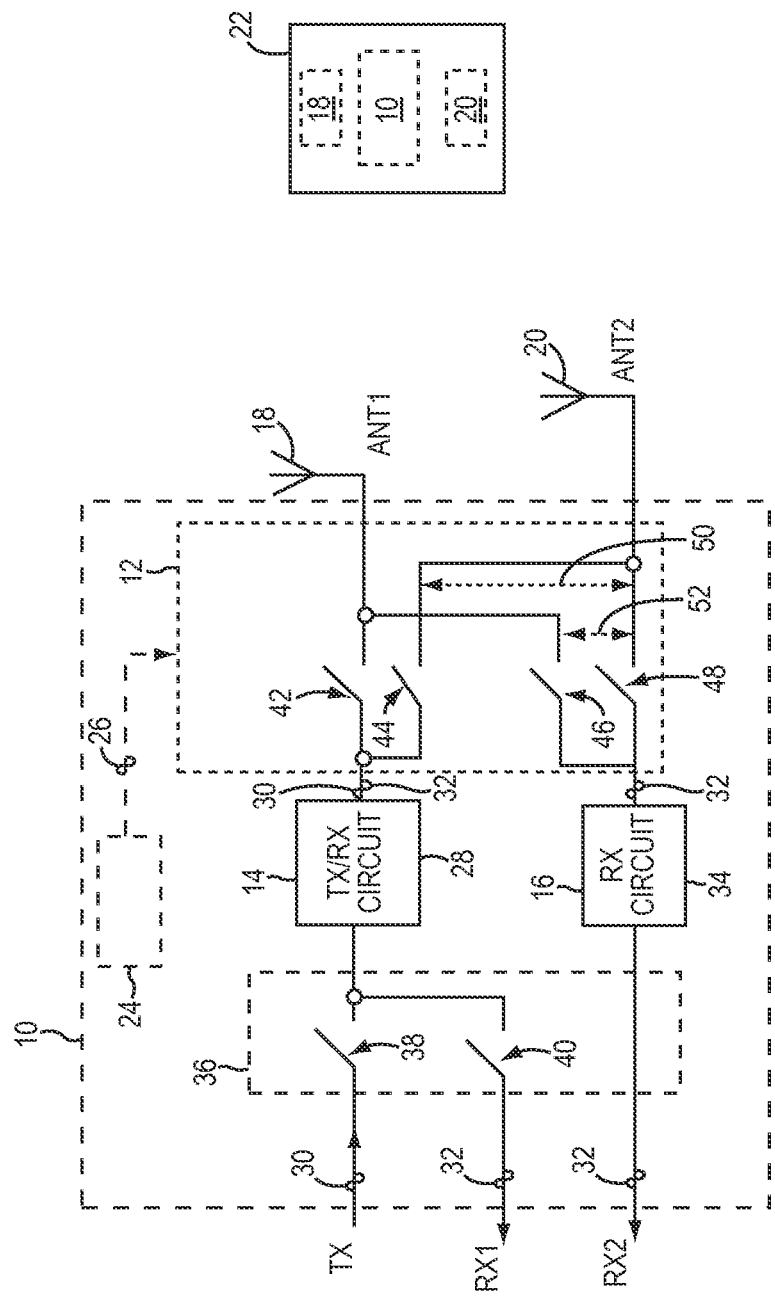
FIG. 1 is a schematic diagram of an exemplary conventional communication circuit that employs a conventional antenna switching circuit to switch a first radio frequency (RF) signal path and a second RF signal path between a first antenna and a second antenna.

Before discussing the antenna switching concepts of the present disclosure, a brief overview of a conventional communication circuit employing a conventional antenna switching circuit is provided with reference to FIG. 1. The discussion of specific exemplary aspects of antenna switching in a communication circuit starts below with reference to FIG. 2.

In this regard, FIG. 1 is a schematic diagram of an exemplary conventional communication circuit 10 that employs a conventional antenna switching circuit 12 to switch a first RF signal path 14 and a second RF signal path 16 between a first antenna 18 and a second antenna 20.

In a non-limiting example, the conventional communication circuit 10 may be provided in a handheld communication device 22 (e.g., smartphone, tablet, phablet, and so on). When the handheld communication device 22 is held in a user's hand, the first antenna 18 and the second antenna 20 may be blocked by the user's hand, thus degrading RF performance of the conventional communication circuit 10. As such, it may be necessary to dynamically switch the first RF signal path 14 and the second RF signal path 16 between the first antenna 18 and the second antenna 20 to improve the RF performance of the conventional communication circuit 10.

In this regard, a controller 24 in the conventional communication circuit 10 may detect which of the first antenna 18 and the second antenna 20 is blocked by the user's hand. If one antenna, for example first antenna 18, is blocked by the user's hand, the controller 24 may dynamically control the conventional antenna switching circuit 12 to couple the second antenna 20 to the conventional communication circuit 10. If both the first antenna 18 and the second antenna 20 are blocked by the user's hand, the controller 24 may control the conventional antenna switching circuit 12 to couple a lesser-impacted antenna between the first antenna 18 and the second antenna 20 to the conventional communication circuit 10. In a non-limiting example, the controller 24 may control the conventional antenna switching circuit 12 to switch between the first antenna 18 and the second antenna 20 via a control signal 26.

The first RF signal path 14 includes a transmit (TX) and receive (RX) (TX/RX) circuit 28 configured to transmit a first RF signal 30 via either the first antenna 18 or the second antenna 20. The TX/RX circuit 28 is also configured receive a second RF signal 32 via either the first antenna 18 or the second antenna 20. The second RF signal path 16 includes an RX circuit 34 configured to receive the second RF signal 32 via either the first antenna 18 or the second antenna 20. Because the first antenna 18 and the second antenna 20 are unable to transmit the first RF signal 30 and receive the second RF signal 32 simultaneously, the conventional communication circuit 10 must alternate between transmitting the first RF signal 30 and receiving the second RF signal 32.

The TX/RX circuit 28 and the RX circuit 34 are coupled to a signal switching circuit 36 configured to provide the first RF signal 30 to the TX/RX circuit 28. The signal switching circuit 36 is also configured to receive the second RF signal 32 from the TX/RX circuit 28 and the RX circuit 34. The signal switching circuit 36 includes a first signal switch 38 and a second signal switch 40. The signal switching circuit 36 closes the first signal switch 38 and opens the second signal switch 40 to provide the first RF signal 30 to the TX/RX circuit 28. The signal switching circuit 36 opens the first signal switch 38 and closes the second signal switch 40 to receive the second RF signal 32 from the TX/RX circuit 28. The signal switching circuit 36 always receives the second RF signal 32 from the RX circuit 34.

The conventional antenna switching circuit 12 includes a first antenna switch 42, a second antenna switch 44, a third antenna switch 46, and a fourth antenna switch 48. To transmit the first RF signal 30, the conventional antenna switching circuit 12 may couple the TX/RX circuit 28 to either the first antenna 18 or the second antenna 20 based on the control signal 26 received from the controller 24. To couple the TX/RX circuit 28 to the first antenna 18, the conventional antenna switching circuit 12 closes the first antenna switch 42 while opening the second antenna switch 44, the third antenna switch 46, and the fourth antenna switch 48. To couple the TX/RX circuit 28 to the second antenna 20, the conventional antenna switching circuit 12 closes the second antenna switch 44 while opening the first antenna switch 42, the third antenna switch 46, and the fourth antenna switch 48.

To receive concurrently the second RF signal 32, the conventional antenna switching circuit 12 may couple the TX/RX circuit 28 to the first antenna 18 and couple the RX circuit 34 to the second antenna 20 by closing the first antenna switch 42 and the fourth antenna switch 48 while keeping the second antenna switch 44 and the third antenna switch 46 open. Alternatively, the conventional antenna switching circuit 12 may also couple the TX/RX circuit 28 to the second antenna 20 and couple the RX circuit 34 to the first antenna 18 by closing the second antenna switch 44 and the third antenna switch 46 while keeping the first antenna switch 42 and the fourth antenna switch 48 open.

The conventional antenna switching circuit 12 has some obvious drawbacks. By including multiple antenna switches, the conventional antenna switching circuit 12 may cause the footprint and cost of the conventional communication circuit 10 to increase significantly. In addition, the multiple antenna switching introduces increased insertion losses between first RF signal path 14, the second RF signal path 16, the first antenna 18, and the second antenna 20. In a non-limiting example, each of the multiple antenna switches may introduce one-tenth of decibel (0.1 dB) insertion loss.

Furthermore, the multiple antenna switches may also degrade RF performance of the conventional communication circuit 10. For example, when the conventional antenna switching circuit 12 closes the first antenna switch 42 to couple the TX/RX circuit 28 to the first antenna 18, the second antenna switch 44, the third antenna switch 46, and the fourth antenna switch 48 are left open. As a result, a first capacitance 50 may be generated between the second antenna switch 44 and the fourth antenna switch 48. In addition, a second capacitance 52 may also exist between the third antenna switch 46 and the fourth antenna switch 48. Because the first capacitance 50 and the second capacitance 52 are parallel to each other, a total capacitance between the first antenna 18 and the second antenna 20 would equal a sum of the first capacitance 50 and the second capacitance 52. Moreover, as frequency of the first RF signal 30 becomes higher (e.g., the three point five gigahertz (3.5 GHz) frequency), the total capacitance between the first antenna 18 and the second antenna 20 also increases proportionally. In a non-limiting example, by including four antenna switches, as opposed to two antenna switches, in the conventional antenna switching circuit 12, the RF isolation between the first antenna 18 and the second antenna 20 may be reduced by six decibels (6 dB).

The total capacitance between the first antenna 18 and the second antenna 20 can reduce RF isolation between the first antenna 18 and the second antenna 20, thus degrading the RF performance of the conventional communication circuit 10. Hence, it may be desirable to reduce the number of antenna switches included in the conventional antenna switching circuit 12 to improve the RF performance and to reduce the footprint and cost of the conventional communication circuit 10.

Figure 2:
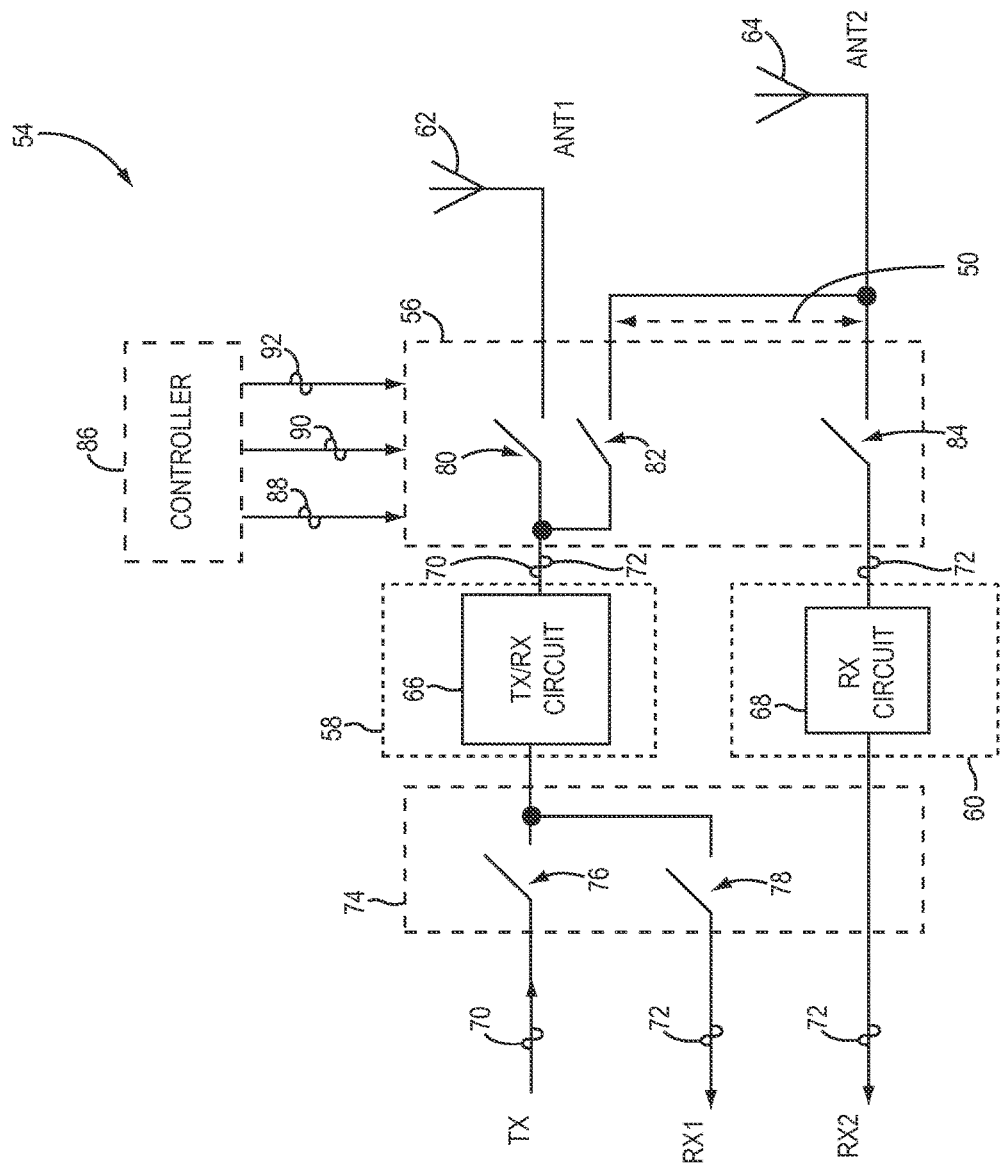
FIG. 2 is a schematic diagram of an exemplary communication circuit that includes an antenna switching circuit configured to improve RF performance of the conventional communication circuit of FIG. 1 by having fewer antenna switches than the conventional antenna switching circuit.

In this regard, FIG. 2 is a schematic diagram of an exemplary communication circuit 54 that includes an antenna switching circuit 56 configured to improve RF performance of the conventional communication circuit 10 of FIG. 1 by having fewer antenna switches than the conventional antenna switching circuit 12.

With reference to FIG. 2, the antenna switching circuit 56 is configured to switch a first RF signal path 58 and a second RF signal path 60 between a first antenna 62 and a second antenna 64. The first RF signal path 58 includes a TX/RX circuit 66 and the second RF signal path 60 includes an RX circuit 68. The TX/RX circuit 66 is configured to transmit a first RF signal 70 via either the first antenna 62 or the second antenna 64. The TX/RX circuit 66 is also configured receive a second RF signal 72 via either the first antenna 62 or the second antenna 64. In contrast to the RX circuit 34 in FIG. 1, the RX circuit 68 is configured to receive the second RF signal 72 only via the second antenna 64.

Because the first antenna 62 and the second antenna 64 are unable to transmit the first RF signal 70 and receive the second RF signal 72 simultaneously, the communication circuit 54 is configured to transmit the first RF signal 70 in an assigned TX period and receive the second RF signal 72 in an assigned RX period. In a non-limiting example, the assigned TX period and the assigned RX period may alternate according to a time-division duplex (TDD) schedule. In this regard, the first RF signal 70 and the second RF signal 72 may be a TDD TX signal and a TDD RX signal, respectively.

The TX/RX circuit 66 and the RX circuit 68 are coupled to a signal switching circuit 74 configured to provide the first RF signal 70 to the TX/RX circuit 66. The signal switching circuit 74 is also configured to receive the second RF signal 72 from the TX/RX circuit 66 and the RX circuit 68. The signal switching circuit 74 includes a first signal switch 76 and a second signal switch 78. During the assigned TX period, the signal switching circuit 74 closes the first signal switch 76 and opens the second signal switch 78 to provide the first RF signal 70 to the TX/RX circuit 66. During the assigned RX period, the signal switching circuit 74 opens the first signal switch 76 and closes the second signal switch 78 to receive the second RF signal 72 from the TX/RX circuit 66. The signal switching circuit 74 always receives the second RF signal 72 from the RX circuit 68 during the assigned RX period.

With continuing reference to FIG. 2, the antenna switching circuit 56 includes a first antenna switch 80, a second antenna switch 82, and a third antenna switch 84. During the assigned TX period, a controller 86 may control the antenna switching circuit 56 to couple the TX/RX circuit 66 to either the first antenna 62 or the second antenna 64. The controller 86 may provide a first antenna selection signal 88 to the antenna switching circuit 56 to couple the TX/RX circuit 66 to the first antenna 62 to transmit the first RF signal 70. In response to the first antenna selection signal 88, the antenna switching circuit 56 closes the first antenna switch 80 while opening the second antenna switch 82 and the third antenna switch 84. The controller 86 may provide a second antenna selection signal 90 to the antenna switching circuit 56 to couple the TX/RX circuit 66 to the second antenna 64 to transmit the first RF signal 70. In response to the second antenna selection signal 90, the antenna switching circuit 56 closes the second antenna switch 82 while opening the first antenna switch 80 and the third antenna switch 84. In a non-limiting example, the controller 86 may select the first antenna 62 or the second antenna 64 for transmitting the first RF signal 70 based on a range of considerations. For example, if a physical object (e.g., a user's hand) blocks the first antenna 62, the controller 86 may select the second antenna 64 to transmit the first RF signal 70. If the first antenna 62 and the second antenna 64 both have acceptable RF performances, the controller 86 may select an antenna between the first antenna 62 and the second antenna 64 that is capable of transmitting the first RF signal 70 at a higher TX power.

During the assigned RX period, to receive concurrently the second RF signal 72, the controller 86 may provide a third antenna selection signal 92 to the antenna switching circuit 56 to couple the TX/RX circuit 66 to the first antenna 62 and couple the RX circuit 68 to the second antenna 64. In response to the third antenna selection signal 92, the antenna switching circuit 56 closes the first antenna switch 80 and the third antenna switch 84 while keeping the second antenna switch 82 open.

Because the RX circuit 68 is only coupled to the second antenna 64 during the assigned RX period, the antenna switching circuit 56 includes one less antenna switch than the conventional antenna switching circuit 12 in FIG. 1. As a result, it may be possible to reduce the footprint print and cost of the communication circuit 54. In addition, it may also be possible to reduce the insertion loss between the TX/RX circuit 66, the RX circuit 68, the first antenna 62, and the second antenna 64.

Furthermore, by eliminating one antenna switch from the antenna switching circuit 56, RF isolation between the first antenna 62 and the second antenna 64 may also be improved. For example, when the antenna switching circuit 56 closes the first antenna switch 80 to couple the TX/RX circuit 66 to the first antenna 62, the second antenna switch 82 and the third antenna switch 84 are left open. In contrast to the example discussed earlier in FIG. 1, only the first capacitance 50 of FIG. 1 exists between the second antenna switch 82 and the third antenna switch 84. The second capacitance 52 of FIG. 1 is eliminated. As a result, RF isolation between the first antenna 62 and the second antenna 64 may be improved, thus improving the RF performance of the communication circuit 54.

Figure 3:
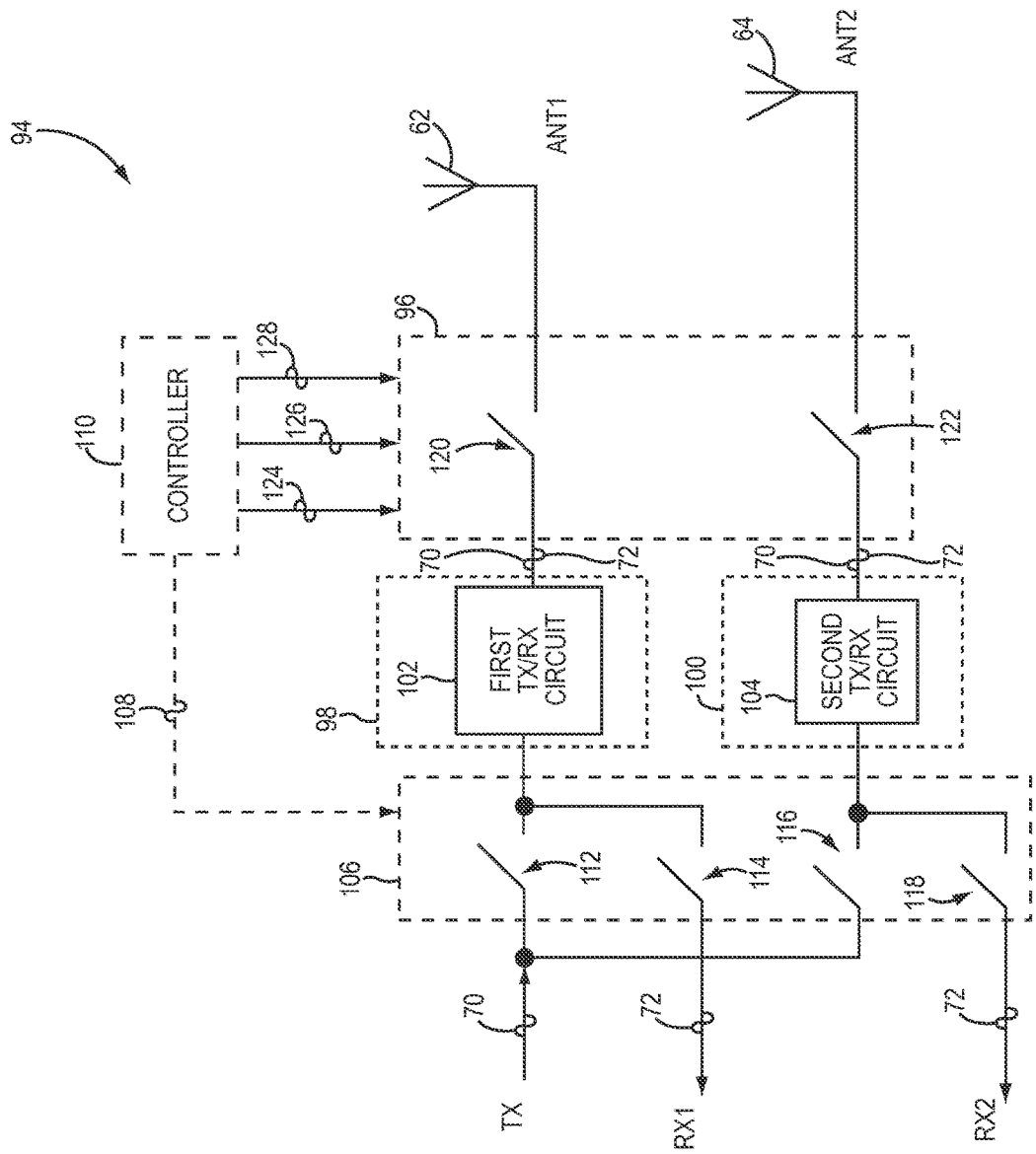
FIG. 3 is a schematic diagram of an exemplary communication circuit configured to further improve RF performance of the communication circuit of FIG. 2 by further reducing the number of antenna switches in an antenna switching circuit.

The antenna switching circuit 56 may be further optimized to further improve the RF performance of the communication circuit 54. In this regard, FIG. 3 is a schematic diagram of an exemplary communication circuit 94 configured to further improve RF performance of the communication circuit 54 of FIG. 2 by further reducing the number of antenna switches in an antenna switching circuit 96. Common elements between FIGS. 2 and 3 are shown therein with common element numbers and thus, will not be re-described herein.

The antenna switching circuit 96 is configured to switch a first RF signal path 98 and a second RF signal path 100 between the first antenna 62 and the second antenna 64. The first RF signal path 98 includes a first TX/RX circuit 102 and the second RF signal path 100 includes a second TX/RX circuit 104. The first TX/RX circuit 102 is configured to transmit the first RF signal 70 and receive the second RF signal 72 via the first antenna 62. The second TX/RX circuit 104 is configured to transmit the first RF signal 70 and receive the second RF signal 72 via the second antenna 64. By coupling the first TX/RX circuit 102 and the second TX/RX circuit 104 to the first antenna 62 and the second antenna 64, respectively, it is possible to further reduce the number of antenna switches in the antenna switching circuit 96 to improve RF isolation between the first antenna 62 and the second antenna 64.

To retain the flexibility of transmitting the first RF signal 70 from either the first antenna 62 or the second antenna 64, the first TX/RX circuit 102 and the second TX/RX circuit 104 are coupled to a signal switching circuit 106. The signal switching circuit 106 is configured to provide the first RF signal 70 either to the first TX/RX circuit 102 for transmission via the first antenna 62 or to the second TX/RX circuit 104 for transmission via the second antenna 64. In a non-limiting example, the signal switching circuit 106 may provide the first RF signal 70 to the first TX/RX circuit 102 or the second TX/RX circuit 104 in response to a control signal 108 received from a controller 110. The signal switching circuit 106 is also configured to receive the second RF signal 72 from the first TX/RX circuit 102 and the second TX/RX circuit 104. In a non-limiting example, the signal switching circuit 106 may be configured to receive the second RF signal 72 from the first TX/RX circuit 102 and the second TX/RX circuit 104 in response to the control signal 108. The signal switching circuit 106 includes a first signal switch 112, a second signal switch 114, a third signal switch 116, and a fourth signal switch 118.

During the assigned TX period, the signal switching circuit 106 may close the first signal switch 112 while keeping the second signal switch 114, the third signal switch 116, and the fourth signal switch 118 open to provide the first RF signal 70 to the first TX/RX circuit 102. During the assigned TX period, the signal switching circuit 106 may also close the third signal switch 116 while keeping the first signal switch 11, the second signal switch 114, and the fourth signal switch 118 open to provide the first RF signal 70 to the second TX/RX circuit 104. During the assigned RX period, the signal switching circuit 106 closes the second signal switch 114 and the fourth signal switch 118 while keeping the first signal switch 112 and the third signal switch 116 open to receive concurrently the second RF signal 72 from the first TX/RX circuit 102 and the second TX/RX circuit 104.

The antenna switching circuit 96 includes a first antenna switch 120 and a second antenna switch 122. During the assigned TX period, the controller 110 may provide a first antenna selection signal 124 to the antenna switching circuit 96 to couple the first TX/RX circuit 102 to the first antenna 62 to transmit the first RF signal 70. In response to the first antenna selection signal 124, the antenna switching circuit 96 closes the first antenna switch 120 and opens the second antenna switch 122. During the assigned TX period, the controller 110 may provide a second antenna selection signal 126 to the antenna switching circuit 96 to couple the second TX/RX circuit 104 to the second antenna 64 to transmit the first RF signal 70. In response to the second antenna selection signal 126, the antenna switching circuit 96 closes the second antenna switch 122 and opens the first antenna switch 120. In a non-limiting example, the controller 110 may select the first antenna 62 or the second antenna 64 for transmitting the first RF signal 70 based on a range of considerations. For example, if a physical object (e.g., a user's hand) blocks the first antenna 62, the controller 110 may select the second antenna 64 to transmit the first RF signal 70. If the first antenna 62 and the second antenna 64 both have acceptable RF performances, the controller 110 may select an antenna between the first antenna 62 and the second antenna 64 that is capable of transmitting the first RF signal 70 at a higher TX power. In a non-limiting example, the first antenna selection signal 124 and the second antenna selection signal 126 may be the same signals as the control signal 108 or related to the control signal 108. In another non-limiting example, the first antenna selection signal 124 and the second antenna selection signal 126 may be independent signals unrelated to the control signal 108.

During the assigned RX period, to receive concurrently the second RF signal 72 from both the first antenna 62 and the second antenna 64, the controller 110 may provide a third antenna selection signal 128 to the antenna switching circuit 96 to couple the first TX/RX circuit 102 and the second TX/RX circuit 104 to the first antenna 62 and the second antenna 64, respectively. In response to the third antenna selection signal 128, the antenna switching circuit 96 closes the first antenna switch 120 and the second antenna switch 122.

Because the first TX/RX circuit 102 is only coupled to the first antenna 62 and the second TX/RX circuit 104 is only coupled to the second antenna 64 during the assigned TX period and the assigned RX period, it is possible to remove another antenna switch in the antenna switching circuit 96. As a result, the first capacitance 50 of FIG. 2 is eliminated between the first antenna 62 and the second antenna 64, thus further improving the RF isolation between the first antenna 62 and the second antenna 64.

The communication circuit 54 of FIG. 2 and the communication circuit 94 of FIG. 3 are both configured to transmit the first RF signal 70 and receive the second RF signal 72 in a single RF band. For example, the communication circuit 54 may be configured to transmit the first RF signal 70 and receive the second RF signal 72 in long-term evolution (LTE) band forty (40) that ranges from twenty-three hundred megahertz (2300 MHz) to twenty-four hundred megahertz (2400 MHz). The communication circuit 94 may be configured to transmit the first RF signal 70 and receive the second RF signal 72 in LTE band thirty-nine (39) that ranges from eighteen hundred eighty megahertz (1880 MHz) to nineteen hundred twenty megahertz (1920 MHz). As user demands for higher-speed, higher-throughput wireless communication services continue to grow, the LTE band 39 or the LTE band 40 alone may not provide sufficient spectrum bandwidth to meet the user demands. As such, a newer wireless communication technology known as carrier aggregation has been developed to allow multiple RF bands (e.g., LTE band 39 and 40) to be aggregated to provide the spectrum bandwidth necessary for the higher-speed, higher-throughput wireless communication services. The communication circuit 54 of FIG. 2 and the communication circuit 94 of FIG. 3 may be further adapted to support carrier aggregation.

Figure 4:
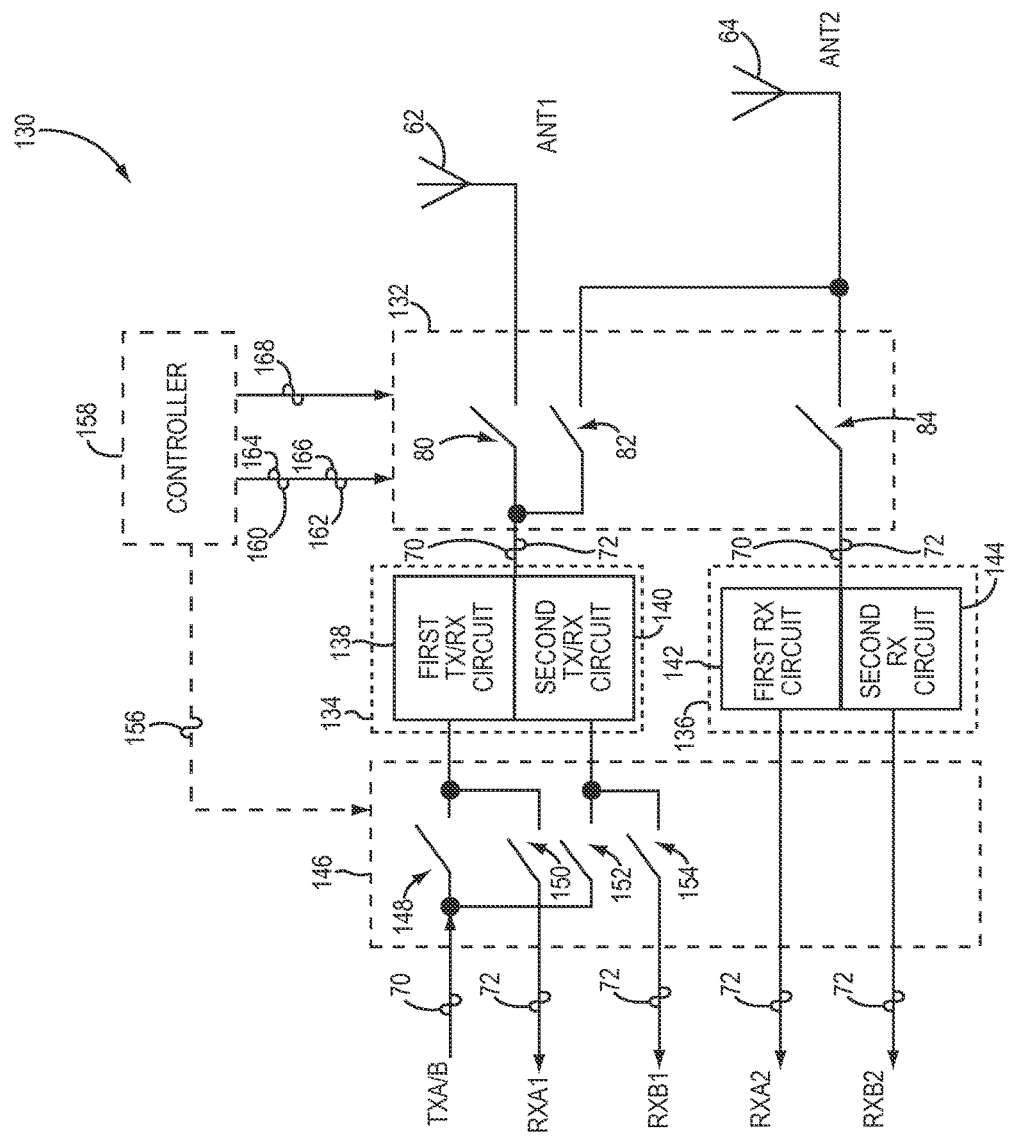
FIG. 4 is a schematic diagram of an exemplary communication circuit that is adapted from the communication circuit of FIG. 2 to support carrier aggregation.

In this regard, FIG. 4 is a schematic diagram of an exemplary communication circuit 130 that is adapted from the communication circuit 54 of FIG. 2 to support carrier aggregation. Common elements between FIGS. 2 and 4 are shown therein with common element numbers and thus, will not be re-described herein.

The communication circuit 130 includes an antenna switching circuit 132 configured to switch a first RF signal path 134 and a second RF signal path 136 between the first antenna 62 and the second antenna 64. The first RF signal path 134 includes a first TX/RX circuit 138 and a second TX/RX circuit 140. The first TX/RX circuit 138 is configured to transmit the first RF signal 70 in a first RF band (not shown) via one of the first antenna 62 and the second antenna 64. The first TX/RX circuit 138 is also configured to receive the second RF signal 72 in the first RF band via the first antenna 62. The second TX/RX circuit 140 is configured to transmit the first RF signal 70 in a second RF band (not shown), which is different from the first RF band, via one of the first antenna 62 and the second antenna 64. The second TX/RX circuit 140 is also configured to receive the second RF signal 72 in the second RF band via the first antenna 62.

The second RF signal path 136 includes a first RX circuit 142 and a second RX circuit 144. The first RX circuit 142 is configured to receive the second RF signal 72 in the first RF band, and the second RX circuit 144 is configured to receive the second RF signal 72 in the second RF band. Both the first RX circuit 142 and the second RX circuit 144 receive the second RF signal 72 via the second antenna 64.

The first TX/RX circuit 138, the second TX/RX circuit 140, the first RX circuit 142, and the second RX circuit 144 are coupled to a signal switching circuit 146. The signal switching circuit 146 includes a first signal switch 148, a second signal switch 150, a third signal switch 152, and a fourth signal switch 154. During the assigned TX period, the signal switching circuit 146 may provide the first RF signal 70 to the first TX/RX circuit 138 to transmit in the first RF band by closing the first signal switch 148 and keeping the second signal switch 150, the third signal switch 152, and the fourth signal switch 154 open. The signal switching circuit 146 may provide the first RF signal 70 to the second TX/RX circuit 140 to transmit in the second RF band by closing the third signal switch 152 while keeping the first signal switch 148, the second signal switch 150, and the fourth signal switch 154 open. In a non-limiting example, the signal switching circuit 146 may provide the first RF signal 70 to the first TX/RX circuit 138 or the second TX/RX circuit 140 in response to a control signal 156 received from a controller 158.

During the assigned RX period, the signal switching circuit 146 may receive concurrently the second RF signal 72 in both the first RF band and the second RF band by closing the second signal switch 150 and the fourth signal switch 154 while keeping the first signal switch 148 and the third signal switch 152 open. The signal switching circuit 146 always receives the second RF signal 72 in the first RF band from the first RX circuit 142 and receives the second RF signal 72 in the second RF band from the second RX circuit 144. In a non-limiting example, the signal switching circuit 146 may be configured to receive the second RF signal 72 from the first TX/RX circuit 138 and the second TX/RX circuit 140 in response to the control signal 156.

The antenna switching circuit 132 includes the first antenna switch 80, the second antenna switch 82, and the third antenna switch 84. During the assigned TX period, the controller 158 may control the antenna switching circuit 132 to couple the first TX/RX circuit 138 to either the first antenna 62 or the second antenna 64. The controller 158 may provide a first antenna selection signal 160 to the antenna switching circuit 132 to couple the first TX/RX circuit 138 to the first antenna 62 to transmit the first RF signal 70 in the first RF band. In response to the first antenna selection signal 160, the antenna switching circuit 132 closes the first antenna switch 80 while keeping the second antenna switch 82 and the third antenna switch 84 open. The controller 158 may provide a second antenna selection signal 162 to the antenna switching circuit 132 to couple the second TX/RX circuit 140 to the first antenna 62 to transmit the first RF signal 70 in the second RF band. In response to the second antenna selection signal 162, the antenna switching circuit 132 closes the first antenna switch 80 while keeping the second antenna switch 82 and the third antenna switch 84 open.

The controller 158 may provide a third antenna selection signal 164 to the antenna switching circuit 132 to couple the first TX/RX circuit 138 to the second antenna 64 to transmit the first RF signal 70 in the first RF band. In response to the third antenna selection signal 164, the antenna switching circuit 132 closes the second antenna switch 82 while keeping the first antenna switch 80 and the third antenna switch 84 open. The controller 158 may provide a fourth antenna selection signal 166 to the antenna switching circuit 132 to couple the second TX/RX circuit 140 to the second antenna 64 to transmit the first RF signal 70 in the second RF band. In response to the fourth antenna selection signal 166, the antenna switching circuit 132 closes the second antenna switch 82 while keeping the first antenna switch 80 and the third antenna switch 84 open.

During the assigned RX period, to receive concurrently the second RF signal 72 in both the first RF band and the second RF band, the controller 258 may provide a fifth antenna selection signal 168 to the antenna switching circuit 132. The fifth antenna selection signal 168 instructs the antenna switching circuit 132 to couple the first TX/RX circuit 138 and the second TX/RX circuit 140 to the first antenna 62. The fifth antenna selection signal 168 instructs the antenna switching circuit 132 to couple the first RX circuit 142 and the second RX circuit 144 to the second antenna 64. In response to the fifth antenna selection signal 168, the antenna switching circuit 132 closes the first antenna switch 80 and the third antenna switch 84 while keeping the second antenna switch 82 open. In a non-limiting example, the first antenna selection signal 160, the second antenna selection signal 162, the third antenna selection signal 164, the fourth antenna selection signal 166, and the fifth antenna selection signal 168 may be the same signals as the control signal 156 or related to the control signal 156. In another non-limiting example, the first antenna selection signal 160, the second antenna selection signal 162, the third antenna selection signal 164, the fourth antenna selection signal 166, and the fifth antenna selection signal 168 may be independent signals unrelated to the control signal 156.

Figure 5:
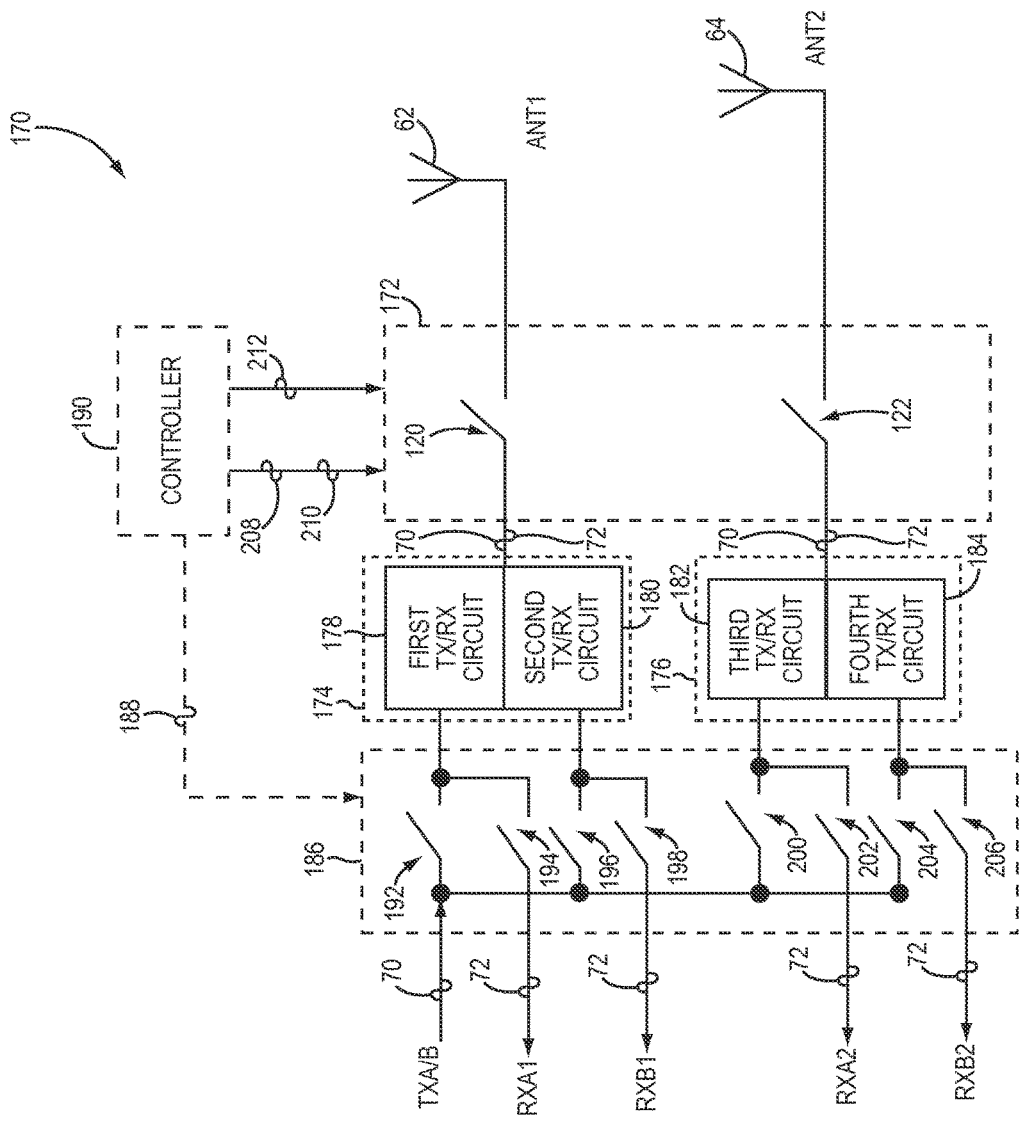
FIG. 5 is a schematic diagram of an exemplary communication circuit that is adapted from the communication circuit of FIG. 3 to support carrier aggregation.

FIG. 5 is a schematic diagram of an exemplary communication circuit 170 that is adapted from the communication circuit 94 of FIG. 3 to support carrier aggregation. Common elements between FIGS. 3 and 5 are shown therein with common element numbers and thus, will not be re-described herein.

The communication circuit 170 includes an antenna switching circuit 172 configured to switch a first RF signal path 174 and a second RF signal path 176 between the first antenna 62 and the second antenna 64.

The first RF signal path 174 includes a first TX/RX circuit 178 and a second TX/RX circuit 180. The first TX/RX circuit 178 is configured to transmit the first RF signal 70 and receive the second RF signal 72 in the first RF band (not shown) via the first antenna 62. The second TX/RX circuit 180 is configured to transmit the first RF signal 70 and receive the second RF signal 72 in the second RF band (not shown) via the first antenna 62. The second RF signal path 176 includes a third TX/RX circuit 182 and a fourth TX/RX circuit 184. The third TX/RX circuit 182 is configured to transmit the first RF signal 70 and receive the second RF signal 72 in the first RF band via the second antenna 64. The fourth TX/RX circuit 184 is configured to transmit the first RF signal 70 and receive the second RF signal 72 in the second RF band via the second antenna 64.

To retain the flexibility of transmitting the first RF signal 70 from either the first antenna 62 or the second antenna 64, the first TX/RX circuit 178, the second TX/RX circuit 180, the third TX/RX circuit 182, and the fourth TX/RX circuit 184 are coupled to a signal switching circuit 186. The signal switching circuit 186 is configured to provide the first RF signal 70 to the first TX/RX circuit 178 or the second TX/RX circuit 180 for transmission via the first antenna 62. The signal switching circuit 186 is also configured to provide the first RF signal 70 to the third TX/RX circuit 182 or the fourth TX/RX circuit 184 for transmission via the second antenna 64. In a non-limiting example, the signal switching circuit 186 may provide the first RF signal 70 to the first TX/RX circuit 178, the second TX/RX circuit 180, the third TX/RX circuit 182, or the fourth TX/RX circuit 184 in response to a control signal 188 received from a controller 190. The signal switching circuit 186 is also configured to receive concurrently the second RF signal 72 from the first TX/RX circuit 178, the second TX/RX circuit 180, the third TX/RX circuit 182, and the fourth TX/RX circuit 184. In a non-limiting example, the signal switching circuit 186 may be configured to receive the second RF signal 72 from the first TX/RX circuit 178, the second TX/RX circuit 180, the third TX/RX circuit 182, and the fourth TX/RX circuit 184 in response to the control signal 188.

The signal switching circuit 186 includes a first signal switch 192, a second signal switch 194, a third signal switch 196, a fourth signal switch 198, a fifth signal switch 200, a sixth signal switch 202, a seventh signal switch 204, and an eighth signal switch 206. During the assigned TX period, the signal switching circuit 186 may close the first signal switch 192 and the fifth signal switch 200 while keeping all other signal switches open to transmit the first RF signal 70 in the first RF band. During the assigned TX period, the signal switching circuit 186 may also close the third signal switch 196 and the seventh signal switch 204 while keeping all other signal switches open to transmit the first RF signal 70 in the second RF band. During the assigned RX period, the signal switching circuit 186 may close the second signal switch 194, the fourth signal switch 198, the sixth signal switch 202, and the eighth signal switch 206 while keeping all other signal switches open to receive concurrently the second RF signal 72 in the first RF band and the second RF band.

The antenna switching circuit 172 includes the first antenna switch 120 and the second antenna switch 122. During the assigned TX period, the controller 190 may provide a first antenna selection signal 208 to the antenna switching circuit 172 to couple the first TX/RX circuit 178 and the third TX/RX circuit 182 to the first antenna 62 and the second antenna 64, respectively, to transmit the first RF signal 70 in the first RF band. In response to the first antenna selection signal 208, the antenna switching circuit 172 closes the first antenna switch 120 and the second antenna switch 122. The controller 190 may provide a second antenna selection signal 210 to the antenna switching circuit 172 to couple the second TX/RX circuit 180 and the fourth TX/RX circuit 184 to the first antenna 62 and the second antenna 64, respectively, to transmit the first RF signal 70 in the second RF band. In response to the second antenna selection signal 210, the antenna switching circuit 172 closes the first antenna switch 120 and the second antenna switch 122.

To receive concurrently the second RF signal 72 in both the first RF band and the second RF band during the assigned RX period, the controller 190 may provide a third antenna selection signal 212 to the antenna switching circuit 172 to couple the first TX/RX circuit 178 and the second TX/RX circuit 180 to the first antenna 62 and to couple the third TX/RX circuit 182 and the fourth TX/RX circuit 184 to the second antenna 64. In response to the third antenna selection signal 212, the antenna switching circuit 172 closes the first antenna switch 120 and the second antenna switch 122.

Figure 6:
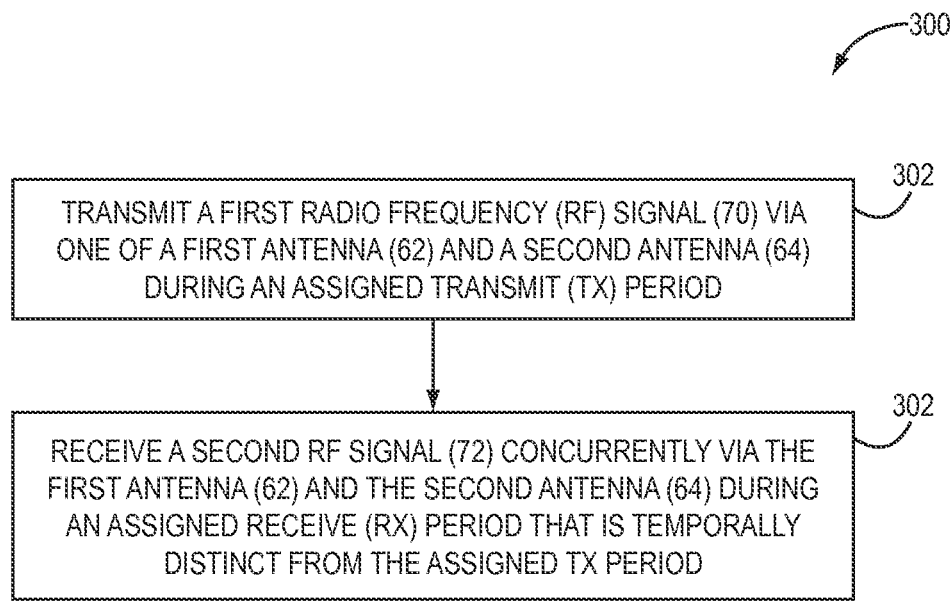
FIG. 6 is a flowchart illustrating an exemplary antenna switching process that may be employed by the communication circuit of FIG. 2.

FIG. 6 is a flowchart illustrating an exemplary antenna switching process 300 that may be employed by the communication circuit 54 of FIG. 2. According to the antenna switching process 300, the communication circuit 54 transmits the first RF signal 70 via one of the first antenna 62 and the second antenna 64 during the assigned TX period (block 302). Further according to the antenna switching process 300, the communication circuit 54 receives the second RF signal 72 concurrently from the first antenna 62 and the second antenna 64 during the assigned RX period that is temporally distinct from the assigned TX period (block 304). By transmitting the first RF signal 70 via either the first antenna 62 or the second antenna 64, it is possible to maintain desired TX performance of the communication circuit 54 when one of the first antenna 62 and the second antenna 64 is blocked. By receiving the second RF signal 72 via both the first antenna 62 and the second antenna 64, it is possible to improve RX performance of the communication circuit 54 through diversity combining.

Those skilled in the art will recognize improvements and modifications to the embodiments of the present disclosure. All such improvements and modifications are considered within the scope of the concepts disclosed herein and the claims that follow.

What is claimed is:
1. A communication circuit, comprising:
a first radio frequency (RF) signal path configured to transmit a first RF signal during an assigned transmit (TX) period and receive a second RF signal during an assigned receive (RX) period temporally distinct from the assigned TX period;
a second RF signal path configured to receive the second RF signal during the assigned RX period; and
an antenna switching circuit comprising a first antenna switch, a second antenna switch, and a third antenna switch and configured to:
close the first antenna switch, open the second antenna switch, and open the third antenna switch to transmit the first RF signal in a first RF band during the assigned TX period via a first antenna;
close the first antenna switch, open the second antenna switch, and open the third antenna switch to transmit the first RF signal in a second RF band during the assigned TX period via the first antenna;
open the first antenna switch, close the second antenna switch, and open the third antenna switch to transmit the first RF signal in the first RF band during the assigned TX period via a second antenna;
open the first antenna switch, close the second antenna switch, and open the third antenna switch to transmit the first RF signal in the second RF band during the assigned TX period via the second antenna;
close the first antenna switch to receive concurrently the second RF signal in the first RF band and the second RF band during the assigned RX period via the first antenna;
close the third antenna switch to receive concurrently the second RF signal in the first RF band and the second RF band during the assigned RX period via the second antenna; and decouple the second RF signal path from the second antenna during the assigned RX period in response to the first RF signal path being coupled to the second antenna.

2. The communication circuit of claim 1 wherein:
the first RF signal is a time-division duplex (TDD) TX signal;
the second RF signal is a TDD RX signal; and
the assigned TX period and the assigned RX period alternate according to a TDD schedule.

3. The communication circuit of claim 1 wherein:
the first RF signal path comprises a transmit and receive (TX/RX) circuit configured to:
 transmit the first RF signal via one of the first antenna and the second antenna; and
 receive the second RF signal via the first antenna; and
the second RF signal path comprises an RX circuit configured to receive the second RF signal via the second antenna.

4. The communication circuit of claim 3 wherein:
the TX/RX circuit and the RX circuit are coupled to a signal switching circuit that comprises a first signal switch and a second signal switch; and
the signal switching circuit is configured to:
 close the first signal switch and open the second signal switch to provide the first RF signal to the TX/RX circuit to transmit during the assigned TX period; and
 open the first signal switch and close the second signal switch to receive the second RF signal from the TX/RX circuit during the assigned RX period.

5. The communication circuit of claim 4 wherein the antenna switching circuit is further configured to:
 close the first antenna switch, open the second antenna switch, and open the third antenna switch to couple the TX/RX circuit to the first antenna to transmit the first RF signal during the assigned TX period in response to a first antenna selection signal;
 open the first antenna switch, close the second antenna switch, and open the third antenna switch to couple the TX/RX circuit to the second antenna to transmit the first RF signal during the assigned TX period in response to a second antenna selection signal; and
 close the first antenna switch, open the second antenna switch, and close the third antenna switch to couple the TX/RX circuit and the RX circuit to the first antenna and the second antenna, respectively, to receive the second RF signal during the assigned RX period in response to a third antenna selection signal.

6. The communication circuit of claim 1 wherein:
the first RF signal path comprises a first transmit and receive (TX/RX) circuit configured to transmit the first RF signal and receive the second RF signal via the first antenna; and
the second RF signal path comprises a second TX/RX circuit configured to transmit the first RF signal and receive the second RF signal via the second antenna.

7. The communication circuit of claim 6 wherein:
the first TX/RX circuit and the second TX/RX circuit are further coupled to a signal switching circuit that comprises a first signal switch, a second signal switch, a third signal switch, and a fourth signal switch; and
the signal switching circuit is configured to:
 close the first signal switch, open the second signal switch, open the third signal switch, and open the fourth signal switch to provide the first RF signal to the first TX/RX circuit during the assigned TX period;
 open the first signal switch, open the second signal switch, close the third signal switch, and open the fourth signal switch to provide the first RF signal to the second TX/RX circuit during the assigned TX period; and
 open the first signal switch, close the second signal switch, open the third signal switch, and close the fourth signal switch to receive concurrently the second RF signal from the first TX/RX circuit and the second TX/RX circuit during the assigned RX period.

8. The communication circuit of claim 1 wherein:
the first RF signal path comprises:
 a first transmit and receive (TX/RX) circuit configured to:
  transmit the first RF signal in the first RF band via one of the first antenna and the second antenna; and
  receive the second RF signal in the first RF band via the first antenna; and
 a second TX/RX circuit configured to:
  transmit the first RF signal in the second RF band different from the first RF band via one of the first antenna and the second antenna; and
  receive the second RF signal in the second RF band via the first antenna; and
the second RF signal path comprises:
 a first RX circuit configured to receive the second RF signal in the first RF band via the second antenna; and
 a second RX circuit configured to receive the second RF signal in the second RF band via the second antenna.

9. The communication circuit of claim 8 wherein:
the first TX/RX circuit, the second TX/RX circuit, the first RX circuit, and the second RX circuit are coupled to a signal switching circuit that comprises a first signal switch, a second signal switch, a third signal switch, and a fourth signal switch; and
the signal switching circuit is configured to:
 close the first signal switch, open the second signal switch, open the third signal switch, and open the fourth signal switch to provide the first RF signal to the first TX/RX circuit to transmit in the first RF band during the assigned TX period;
 open the first signal switch, open the second signal switch, close the third signal switch, and open the fourth signal switch to provide the first RF signal to the second TX/RX circuit to transmit in the second RF band during the assigned TX period; and
 open the first signal switch, close the second signal switch, open the third signal switch, and close the fourth signal switch to receive concurrently the second RF signal in the first RF band from the first TX/RX circuit and the second RF signal in the second RF band from the second TX/RX circuit during the assigned RX period.

10. The communication circuit of claim 9 wherein the antenna switching circuit is further configured to:
 close the first antenna switch, open the second antenna switch, and open the third antenna switch to couple the first TX/RX circuit to the first antenna to transmit the first RF signal in the first RF band during the assigned TX period in response to a first antenna selection signal;
 close the first antenna switch, open the second antenna switch, and open the third antenna switch to couple the second TX/RX circuit to the first antenna to transmit the first RF signal in the second RF band during the assigned TX period in response to a second antenna selection signal;

open the first antenna switch, close the second antenna switch, and open the third antenna switch to couple the first TX/RX circuit to the second antenna to transmit the first RF signal in the first RF band during the assigned TX period in response to a third antenna selection signal;

open the first antenna switch, close the second antenna switch, and open the third antenna switch to couple the second TX/RX circuit to the second antenna to transmit the first RF signal in the second RF band during the assigned TX period in response to a fourth antenna selection signal;

close the first antenna switch to couple the first TX/RX circuit and the second TX/RX circuit to the first antenna to receive concurrently the second RF signal in the first RF band and the second RF band during the assigned RX period in response to a fifth antenna selection signal; and close the third antenna switch to couple the first RX circuit and the second RX circuit to the second antenna to receive concurrently the second RF signal in the first RF band and the second RF band during the assigned RX period in response to the fifth antenna selection signal.

11. The communication circuit of claim 1 wherein:
the first RF signal path comprises:
  a first transmit and receive (TX/RX) circuit configured to transmit the first RF signal and receive the second RF signal in the first RF band via the first antenna; and
  a second TX/RX circuit configured to transmit the first RF signal and receive the second RF signal in the second RF band different from the first RF band via the first antenna; and the second RF signal path comprises:
  a third TX/RX circuit configured to transmit the first RF signal and receive the second RF signal in the first RF band via the second antenna; and
  a fourth TX/RX circuit configured to transmit the first RF signal and receive the second RF signal in the second RF band via the second antenna.

12. The communication circuit of claim 11 wherein:
the first TX/RX circuit, the second TX/RX circuit, the third TX/RX circuit, and the fourth TX/RX circuit are coupled to a signal switching circuit that comprises a first signal switch, a second signal switch, a third signal switch, a fourth signal switch, a fifth signal switch, a sixth signal switch, a seventh signal switch, and an eighth signal switch; and the signal switching circuit is configured to:
  close the first signal switch, close the fifth signal switch, and open all other signal switches to respectively provide the first RF signal to the first TX/RX circuit and the third TX/RX circuit to transmit concurrently in the first RF band during the assigned TX period;
  close the third signal switch, close the seventh signal switch, and open all other signal switches to respectively provide the first RF signal to the second TX/RX circuit and the fourth TX/RX circuit to transmit concurrently in the second RF band during the assigned TX period;
  close the second signal switch, close the fourth signal switch, close the sixth signal switch, close the eighth signal switch, and open all other signal switches to receive concurrently the second RF signal in the first RF band and the second RF band during the assigned RX period.

* * * * *